United States Patent [19]

Russ

[11] Patent Number: 4,974,406
[45] Date of Patent: Dec. 4, 1990

[54] APPARATUS FOR TREATING LAWNS

[76] Inventor: Norman Russ, Box 508, Norwich, Conn. 06360

[21] Appl. No.: 429,394

[22] Filed: Oct. 31, 1989

[51] Int. Cl.⁵ .............................................. A01D 7/10
[52] U.S. Cl. ...................................... 56/351; 172/547; 404/131
[58] Field of Search ................. 56/351, 362, 352, 364; 172/21, 547, 607, 608; 404/129, 131

[56] References Cited

U.S. PATENT DOCUMENTS

| 3,451,488 | 6/1969 | Taketa | 172/547 |
| 3,934,390 | 1/1976 | Ballard | 172/21 |

FOREIGN PATENT DOCUMENTS

| 0212703 | 3/1924 | United Kingdom | 404/129 |
| 0405769 | 2/1934 | United Kingdom | 404/131 |

Primary Examiner—Ramon S. Britts
Assistant Examiner—Terry Lee Melius
Attorney, Agent, or Firm—McCormick, Paulding & Huber

[57] ABSTRACT

A spiked drum is provided with a handle and frame to permit pushing the drum across the ground to pick up leaves on the spikes. The leaves are brushed off the spikes and into a basket by a rotating brush that is driven by the drum and is co-extensive in length with the drum.

6 Claims, 1 Drawing Sheet

APPARATUS FOR TREATING LAWNS

This invention relates generally to apparatus for treating lawns and deals more particularly with an apparatus capable of aerating a lawn, rolling the lawn, and picking up leaves from the lawn.

In accordance with the present invention a cylindrical drum is provided with projecting spikes that are adapted to puncture the ground aerating the lawn as the device is pushed across the ground. As these spikes move upwardly between two spaced side frame members a rotating brush removes the leaves from the drum and directs the leaves into a basket provided between these side frame members. A handle at the end of the side frame members permits the device to be pushed across the lawn for aerating the ground and picking up leaves.

DETAILED DESCRIPTION OF THE DRAWINGS

DETAILED DESCRIPTION

Figure 1:
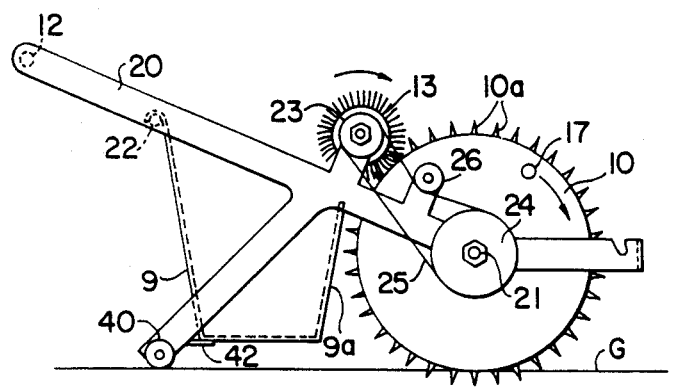
FIG. 1 is a side elevational view of an apparatus constructed in accordance with the present invention.

Turning now to the drawings in greater detail, FIG. 1 shows a generally hollow cylindrical drum 10 preferably formed of steel plate and welded to the desired shape with a filler plunger 17 provided in one end or face of the drum so that the drum can be partially filled with water to roll the lawn while the lawn is being aerated and leaves picked up in accordance with the present invention.

Figure 2:
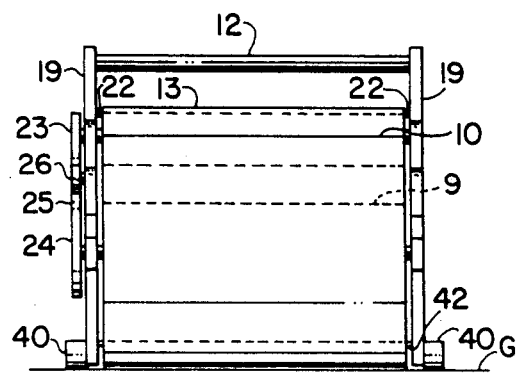
FIG. 2 is a front view of the FIG. 1 apparatus.

A metal frame 20 is provided to define a support for rotating brush 13 and for the drum 10. The frame 20 comprises laterally spaced side members 19, 19 as best shown in FIG. 2 which side frame members have upper end portions that support a handle 12. The lower end portions of the side frame members 19 rotatably support the drum on stub shafts as indicated generally at 21 in FIG. 1. These side frame members 19 also include depending legs 40, 40 the lower ends of which legs may include rollers so as to facilitate pushing of the apparatus across a lawn when water is provided in the drum. A generally rectangular upwardly open basket 9 is supported from the side frame members by pins 22, 22 and by a shelf 42 provided for this purpose on the depending legs 40, 40. The basket 9 includes a front wall 9a that has its upper end generally below the periphery of the brush 13 and in closely spaced relationship to the path of the spikes 10a on the drum 10. As so constructed and arranged the spikes 10a will pick up leaves from the surface of the ground G carrying the leaves clockwise around the drum until bristles of the brush 13 remove the leaves from the spikes and direct the leaves into the basket 9.

Means is provided for achieving rotation of the brush 13 for this purpose and said means preferably comprises pulleys 23, 24 provided respectively on the support shafts for the brush and the drum with a drive belt 25 provided over these pulleys so that rotation of the drum causes rotation of the brush as well. A tensioning device 26 is provided for the belt 25 and the sizes of the pulleys associated with the brush and the drum are such that the brush rotates at a peripheral speed greater than the peripheral speed of the spikes on the drum.

I claim:

1. A leaf picker comprising a generally cylindrical drum having radially projecting spikes provided thereon, a frame having a handle portion and side frame members extending from the handle to the ends of the cylindrical drum for rotatably supporting the drum about a drum axis, a generally cylindrical bristle brush coextensive in length with the drum and rotatably supported about a brush axis that is parallel to the drum axis in said side frame members, an upwardly open basket supported between said side frame members between said handle and said cylindrical drum, said basket including a front wall adjacent to the drum and generally below the brush axis, and means for rotating the brush in the same direction as the drum is rotated to brush leaves from the spikes downwardly and into said basket.

2. The combination of claim 1 wherein said side frame members further including depending legs for supporting the handle at a predetermined distance above the ground, said supporting legs including rollers to facilitate pushing of the device along the ground.

3. The combination of claim 2 wherein said means for rotating the brush in response to rotation of the drum comprises pulleys provided on said drum and brush respectively, and a drive belt entrained around said pulleys.

4. The combination of claim 3 above wherein means is provided for tensioning said drive belt.

5. The combination according to claim 4 above wherein the pulleys for said drum and brush respectively have a size, or diameter such that the peripheral speed of the brush exceeds that of the drum.

6. The combination of claim 5 above wherein the front wall of said basket is spaced below the brush to provide a space for leaves brushed off the spikes of the drum to facilitate entry to the basket.

* * * * *